(12) United States Patent
Deng et al.

(10) Patent No.: US 7,867,294 B2
(45) Date of Patent: Jan. 11, 2011

(54) TRIAZINE COMPOUNDS FOR REMOVING ACIDS AND WATER FROM NONAQUEOUS ELECTROLYTES FOR ELECTROCHEMICAL CELLS

(75) Inventors: Zhongyi Deng, Valley View, OH (US); Jerry L. Decker, Charleston, WV (US); Wu Xu, Broadview Heights, OH (US); John R. Sans, Akron, OH (US); Pascal Bolomey, Solon, OH (US)

(73) Assignee: Novolyte Technologies Inc., Zachary, LA (US)

( * ) Notice: Subject to any disclaimer, the term of this patent is extended or adjusted under 35 U.S.C. 154(b) by 0 days.

(21) Appl. No.: 12/760,102

(22) Filed: Apr. 14, 2010

(65) Prior Publication Data

US 2010/0192363 A1 Aug. 5, 2010

Related U.S. Application Data

(62) Division of application No. 11/138,907, filed on May 26, 2005, now Pat. No. 7,727,669.

(51) Int. Cl.
*H01M 6/00* (2006.01)

(52) U.S. Cl. ............ 29/623.2; 29/623.1; 29/623.3; 29/623.5; 429/200; 429/324; 429/326; 429/328; 429/339; 429/337; 429/338; 429/341; 429/342; 429/343; 429/330; 429/231.1; 429/231.2; 429/231.3; 429/231.5; 429/231.8; 429/231.95; 429/218.1; 429/225; 429/231.4

(58) Field of Classification Search ............. 29/623.1, 29/623.2, 623.3, 623.5; 429/200, 324, 326, 429/328, 339, 337, 338, 341, 342, 343, 330, 429/231.1, 231.3, 231.2, 231.5, 231.8, 231.95, 429/218.1, 231.4
See application file for complete search history.

(56) References Cited

U.S. PATENT DOCUMENTS

| 6,249,807 | B1 | 6/2001 | Shaw et al. |
|---|---|---|---|
| 6,779,019 | B1 | 8/2004 | Mousseau et al. |
| 6,934,911 | B2 | 8/2005 | Salmimaa et al. |
| 7,363,035 | B2 | 4/2008 | Reilly |
| 2002/0087656 | A1 | 7/2002 | Gargiulo et al. |
| 2003/0098892 | A1 | 5/2003 | Hiipakka |
| 2003/0115270 | A1 | 6/2003 | Funk et al. |
| 2003/0120957 | A1 | 6/2003 | Pathiyal |
| 2003/0161288 | A1 | 8/2003 | Unruh |
| 2003/0195925 | A1 | 10/2003 | Kaneko et al. |
| 2005/0102422 | A1 | 5/2005 | Yamamote et al. |
| 2007/0038717 | A1 | 2/2007 | Burkholder et al. |
| 2007/0088786 | A1 | 4/2007 | Hardy et al. |
| 2007/0150816 | A1 | 6/2007 | Hariki |
| 2007/0174785 | A1 | 7/2007 | Perttula |

FOREIGN PATENT DOCUMENTS

| EP | 1 482 702 | 12/2004 |
|---|---|---|
| WO | 2005002187 | 1/2005 |
| WO | 2005064895 | 7/2005 |

*Primary Examiner*—Laura S Weiner
(74) *Attorney, Agent, or Firm*—Rankin, Hill & Clark LLP

(57) ABSTRACT

A process is provided to produce non-aqueous electrolytic solution for use in batteries having low acid content and low water content. The invention involves removing acids and water from non-aqueous electrolytic solutions typically found in lithium or lithium-ion batteries by using nitrogen-containing compounds such as triazines. After treatment by a triazine such as melamine, the concentrations of acids and water in the electrolytic solutions are substantially decreased. The present invention provides a process to prepare extremely pure electrolytic solutions having low (<20 ppm) concentrations of both water and acids.

7 Claims, No Drawings

TRIAZINE COMPOUNDS FOR REMOVING ACIDS AND WATER FROM NONAQUEOUS ELECTROLYTES FOR ELECTROCHEMICAL CELLS

CROSS REFERENCES TO RELATED APPLICATIONS

This is a divisional of U.S. application Ser. No. 11/138,907 filed May 26, 2005, now U.S. Pat. No. 7,727,669.

BACKGROUND OF THE INVENTION

1. Field of Invention

The present invention relates to non-aqueous electrolytic solutions and electrochemical cells that contain such solutions. More particularly, this invention pertains to non-aqueous electrolytic solutions having a very low content of water and acids, and the preparation of such solutions. The invention further relates to a method of reducing at least one of the acid content and the water content in a non-aqueous electrolytic solution for use in an electrochemical cell.

2. Description of Related Art

Electric current producing cells such as batteries consist of pairs of electrodes of opposite polarity separated by electrolytic solution, which includes a solvent and a solute. The charge flow between electrodes is maintained by an ionically conducting solute, i.e., a salt. The non-aqueous electrolytic solutions, which are used in lithium and lithium ion batteries, are made by dissolving lithium salts in a variety of organic solvents. In particular, nonaqueous electrolytes comprising lithium hexafluorophosphate ($LiPF_6$) exhibit very good electrochemical stability and conductivity. However, $LiPF_6$ is not thermally stable and readily decomposes by hydrolysis, as set forth in the following well-known reactions:

$$LiPF_6 \rightarrow LiF + PF_5 \quad (1)$$

$$LiPF_6 + H_2O \rightarrow 2HF + LiF + POF_3 \quad (2)$$

Thermal decomposition of $LiPF_6$ occurs at elevated temperatures (Reaction 1), and is accelerated in solution due to the reactions of $PF_5$ and solvents. Hydrolysis (Reaction 2) generally occurs due to moisture and acidic impurities in the lithium salt and electrolytic solution. Accordingly, both water and hydrogen fluoride (HF) are undesirable in lithium and lithium-ion battery systems. The strong acid HF is especially harmful to batteries because it reacts with electrode active materials and corrodes the solid electrolyte interface (SEI), which results in poor battery performance. Thus the performance of such an electrolytic solution, and hence of a battery made therewith, is not optimal.

One method of removing acidic impurities in the electrolytes is to treat the electrolytes with a strong base and then maintain the electrolytes under basic conditions. U.S. Pat. No. 5,378,445 to Salmon et al. (hereby incorporated by reference into the present disclosure) describes the use of ammonia to prevent the acid-catalyzed decomposition of $LiPF_6$. However, the presence of both ammonia and reaction products of ammonia, e.g. $NH_4F$ formed by the reaction of hydrogen fluoride and ammonia in the electrolytes may be detrimental to battery performance.

SUMMARY OF THE INVENTION

The present invention provides a process for removing moisture and acidic species from lithium-based non-aqueous electrolytic solutions used in lithium and lithium-ion batteries. The invention further provides a process for the production of highly pure non-aqueous electrolytic solutions. The process does not require the addition of a strong base such as ammonia which when added to the lithium salt based electrolytes usually must be removed from the final product.

Broadly, the invention provides a method of reducing at least one of the water content or the acid content in a non-aqueous electrolytic solution for a secondary battery comprising: contacting a non-aqueous electrolytic solution with a triazine compound.

In particular, the process for removing moisture and acidic species from lithium-based electrolytic solutions comprises contacting a non-aqueous electrolytic solution with a triazine such as melamine or melamine resin to complex and sequester the water and acidic species from the solution. The non-aqueous electrolytic solution comprises (a) one or more solvents and (b) one or more lithium salts and optionally (c) one or more additives. Typically the lithium salts are $LiPF_6$ and $LiBF_4$ and the solvents can be, e.g., ethylene carbonate (EC), dimethyl carbonate (DMC), diethyl carbonate (DEC), ethylmethyl carbonate (EMC), propylene carbonate (PC), and gamma-butyrolactone (GBL). Triazines such as melamine have very limited solubility (<0.3 wt %) in typical electrolytes such as 1M $LiPF_6$ in EC/DMC/EMC, so melamine is readily removed from the solution. Residual melamine (<0.3 wt % soluble) in the electrolytic solution is a performance-enhancing additive in lithium or lithium-ion batteries.

Further, the invention provides a method of making a secondary battery comprising: providing an electrolytic solution comprising a non-aqueous electrolytic solvent and a lithium containing salt, contacting the electrolytic solution with a triazine compound, removing substantially all of the triazine compound from the electrolytic solution, laminating and winding a cathode, a first porous separator, an anode, and a second porous separator, placing the wound laminated electrodes and separators in a battery case, infusing the electrolytic solution into the battery case, and sealing the battery case containing the electrodes, electrolytic solution and separators.

Finally, the invention provides a method of preparing a non-aqueous electrolytic solution for a lithium battery wherein the electrolytic solution comprises less than about 20 ppm water and less than about 50 ppm acids, wherein the method comprises: contacting a non aqueous electrolyte with a triazine compound.

These and other features and advantages of the present invention will become more readily apparent to those skilled in the art upon consideration of the following detailed description that described both the preferred and alternative embodiments of the present invention.

DETAILED DESCRIPTION OF THE INVENTION

It has been discovered that according to the process of the present invention, a weakly basic triazine compound that is a solid at room temperature (i.e., 25° C.) can be used to remove moisture and acids from lithium-based electrolytic solutions. Melamine (i.e., 2,4,6-triamino-1,3,5-triazine) is an example. The treated electrolytic solutions have a low level of residual moisture and acids thereby limiting or reducing decomposition and hydrolysis of the lithium salts and increasing the stability of the lithium salts, and therefore, of the electrolytic solutions. Preferred embodiments of the invention include the treatment of $LiPF_6$ based electrolytic solutions, but the invention is not limited thereto and may be used with lithium salts in general such as $LiBF_4$, $LiAsF_6$, $LiSbF_6$, LiBOB, $LiCF_3SO_3$, $LiN(SO_2CF_3)_2$, and combinations thereof.

The present invention provides a method of reducing at least one of the water content or the acid content in a non-aqueous electrolytic solution for a lithium battery comprising contacting a non-aqueous electrolytic solution with a triazine compound. To facilitate its removal, it is advantageous when the triazine compound is a solid at 25° C. In a preferred embodiment, both the water and the acid content are reduced by treatment with a triazine compound. It is also preferred that the non-aqueous electrolytic solution so prepared contains less than 20 ppm water and less than 50 ppm acids. In a more preferred embodiment, the resulting water content is less than 10 ppm and acids content is less than 20 ppm. Usually, the acids content will be reduced by at least 10%, more preferably at least 20%, and more preferably, at least 30%, relative to the initial concentration. Similar reductions in water content may be achieved. The triazine compound may later be removed from the non-aqueous electrolytic solution. Typically, after agitation, whatever excess triazine compound remains (i.e., the insoluble portion) will be filtered out, leaving the soluble portion in the solution.

A method of making a secondary battery is also disclosed. The method comprises providing an electrolytic solution comprising a non-aqueous electrolytic solvent and a lithium containing salt, contacting the electrolytic solution with a triazine compound, removing substantially all of the triazine compound from the electrolytic solution, laminating and winding a cathode, a first porous separator, an anode, and a second porous separator, placing the wound laminated electrodes and separators in a battery case, infusing the electrolytic solution into the battery case, and sealing the battery case containing the electrodes, electrolytic solution and separators. The major ingredients (triazine compound, salts, solvents, anode materials and cathode materials) are each described in turn hereinbelow.

Triazine compound. The triazine compound used to sequester water and acids should be at least weakly basic. It is preferably also a solid at room temperature (i.e., 25° C.) to facilitate precipitation and filtration from a solution. A low solubility in the non-aqueous solvents typically used in lithium and lithium-ion batteries is desirable, because excess triazine compound (more than 3 wt %) in the electrolytic solution can degrade battery performance. Hence, the triazine should be soluble in the non-aqueous electrolytic solution to the extent of less than 5 wt %, preferably less than 3 wt %, and more preferably less than 1 wt %. After treatment, it is preferable to remove any triazine in the solution beyond the solubility limit. Suitable triazines include those having the formula 2-$R^1$-4-$R^2$-6-$R^3$-1,3,5-triazine, wherein $R^1$, $R^2$, and $R^3$ are independently selected from the group consisting of hydrogen, halogen, $C_1$-$C_{20}$ alkyl, $C_1$-$C_{20}$ alkenyl, phenyl, and substituted phenyl. In a preferred embodiment, so long as they are other than hydrogen or halogen, at least one of $R^1$, $R^2$, and $R^3$ further comprises a substituent selected from the group consisting of O, S, CO, $CO_2$, SO, $SO_2$, $NR^4$, $NR^4R^5$, $PR^6$, or $Si(R^7R^8)$, wherein $R^4$ to $R^8$ are independently selected from the group consisting of hydrogen, halogen, $C_1$ to $C_{20}$ saturated alkyl, $C_1$-$C_{20}$ alkenyl, or substituted alkyl, phenyl, or substituted phenyl. Optionally, any of $R^4$-$R^8$ may further contain at least one of O, S, CO, $CO_2$, SO, $SO_2$, amine, phosphorous linkage or silica linkage. In particular, the triazine compound may be selected from 2,6-bis-(2,4-dimethylphenyl)-4-(2-hydroxy-4-octyloxyphenyl)-s-triazine; 2,6-bis(2,4-dimethylphenyl)-4-(2,4-dihydroxyphenyl)-s-triazine; 2,4-bis(2,4-dihydroxyphenyl)-6-(4-chlorophenyl)-s-triazine; 2,4-bis(2-hydroxy(2-hydroxyethoxy)phenyl)-6-(4-chlorophenyl)-s-triazine; 2,4-bis(2-hydroxy-4-(2-hydroxyethoxy)phenyl)-phenyl-s-triazine; 2,4-bis(2-hydroxy-4-(2-hydroxyethoxy)-phenyl)-6-(2,4-dimethylphenyl)-s-triazine; 2,4-bis(2-hydroxy(2-hydroxyethoxy)phenyl)-6-(4-bromophenyl)-s-triazine; 2,4-bis(2-hydroxy-4-(2-acetoryethoxy)phenyl)-6-(4-chlorophenyl)-s-triazine; 2,4-bis(2,4-dihydroxyphenyl)-6-(2,4-dimethylphenyl)-1-s-triazine; melamine; 2,4,6-trimethoxy-1,3,5-triazine; 2,4,6-triphenyoxy-1,3,5-triazine; 2,4,6-triethoxy-1,3,5-triazine; 2,4,6-tripropoxy-1,3,5-triazine; 2,4,6-tributoxy-1,3,5-triazine and combinations thereof. Most preferred are melamine and melamine resin.

Salt. The salts herein are ionic salts containing at least one metal ion. Typically this metal ion is lithium ($Li^+$). The salts herein function to transfer charge between the anode and the cathode of a battery. One class of salts includes lithium salts that are perhalogenated or peroxidated, for example, $LiPF_6$, $LiBF_4$, $LiSbF_6$, $LiAsF_6$, $LiTaF_6$, $LiAlCl_4$, $Li_2B_{10}Cl_{10}$, $LiClO_4$, $LiCF_3SO_3$; $LiN(SO_2C_mF_{2m+1})(SO_2C_nF_{2n+1})$ and $LiC(SO_2C_kF_{2k+1})(SO_2C_mF_{2m+1})(SO_2C_nF_{2n+1})$, wherein k=1-10, m=1-10, and n=1-10, respectively; $LiN(SO_2C_pF_{2p}SO_2)$ and $LiC(SO_2C_pF_{2p}SO_2)(SO_2C_qF_{2q+1})$ wherein p=1-10 and q=1-10; and $LiPF_x(R_F)_{6-x}$ and $LiBF_y(R_F)_{4-y}$, wherein $R_F$ represents perfluorinated $C_1$-$C_m$ alkyl groups or perfluorinated aromatic groups, x=0-5, and y=0-3.

Another class of salts useful herein includes lithium salts of chelated orthoborates and chelated orthophosphates (collectively, hereinafter, "ortho-salts"). In a preferred embodiment, the ortho-salt is lithium bis(oxalato)borate (LiBOB). Other ortho-salts may be used as well, either instead of or in addition to, LiBOB, for example, lithium bis(malonato) borate (LiBMB), lithium bis(difluoromalonato) borate (LiBDFMB), lithium (malonato oxalato) borate (LiMOB), lithium (difluoromalonato oxalato) borate (LiDFMOB), lithium tris (oxalato)phosphate (LiTOP), and lithium tris(difluoromalonato) phosphate (LiTDFMP). Any combination of two or more of the aforementioned salts may also be used.

Broadly, the concentration of salts in the electrolytic solution is about 0.01-2.5 M (moles per liter). Preferably the concentration is 0.05-2.0 M, and more preferably 0.1-1.6 M. Most preferably the electrolytic solution comprises $LiPF_6$.

Solvent. The solvent is a non-aqueous, aprotic, polar organic substance which dissolves the solute at room temperature, i.e., 25° C. Blends of more than one solvent may be used. Generally, solvents may be carbonates, carboxylates, lactones, phosphates, five or six member heterocyclic ring compounds, and organic compounds having at least one $C_1$-$C_4$ group connected through an oxygen atom to a carbon. Lactones may be methylated, ethylated and/or propylated. Generally, the electrolytic solution comprises at least one solute dissolved in at least one solvent. Useful solvents herein include ethylene carbonate, propylene carbonate, butylene carbonate, dimethyl carbonate, diethyl carbonate, dipropyl carbonate, dibutyl carbonate, ethyl methyl carbonate, methyl propyl carbonate, ethyl propyl carbonate, tetrahydrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, -propiolactone, δ-valerolactone, trimethyl phosphate, triethyl phosphate, tris(2-chloro ethyl) phosphate, tris(2,2,2-trifluoroethyl) phosphate, tripropyl phosphate, triisopropyl phosphate, tributyl phosphate, trihexyl phosphate, triphenyl phosphate, tritolyl phosphate, and combinations thereof. Other solvents may be used so long as they are non-aqueous and aprotic, and are capable of dissolving the solute salts.

In a preferred embodiment, the solvent is selected from the group consisting of ethylene carbonate (EC), propylene carbonate (PC), dimethyl carbonate (DMC), ethyl methyl carbonate (EMC), diethyl carbonate (DEC) and combinations thereof. In another embodiment, the solvent comprises about 1-50% by volume (vol %) EC, and about 1-99 vol % EMC, and about 1-99 vol % DEC. In another embodiment, the non-aqueous solvent comprises EC, EMC and DEC in a volume ratio of about 1:1:1.

Cathode. The cathode comprises a lithium metal oxide compound. In particular, the cathode comprises at least one lithium mixed metal oxide (MMO). Lithium MMOs contain at least one other metal besides lithium. Typically this other metal is a transition metal. Preferably, the transition metal is selected from the group consisting of Mn, Co, Cr, Fe, Ni, V, and combinations thereof. For example the following lithium MMOs may be used in the cathode: $LiMnO_2$, $LiMn_2O_4$, $LiCoO_7$, $LiFeO_2$, $LiNi_zCO_{1-z}O_2$ (0<z<1), $LiFePO_4$, $Li_3VPO_4$, $LiMn_{0.5}Ni_{0.5}O_2$, $LiMn_{1/3}CO_{1/3}Ni_{1/3}O_2$, $LiNi_rCO_sMe_tO_2$ wherein Me may be one or more of Al, Mg, Ti, B, Ga, or Si and 0<r, s, t<1, and $LiMc_{0.5}Mn_{1.5}O_4$ wherein Mc is a divalent metal, and mixtures thereof.

Anode. The anode may comprise carbon and/or compounds of lithium. The carbon may be in the form of graphite. Lithium metal anodes may be used. Lithium MMOs such as $LiMnO_2$ and $Li_4Ti_5O_{12}$ are also envisioned. Alloys of lithium with transition or other metals (including metalloids) may be used, including LiAl, LiZn, $Li_3Bi$, $Li_3Cd$, $Li_3Sd$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, and combinations thereof. The anode may further comprise an additional material such as a metal oxide including SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, FeO, and combinations thereof.

Either the anode or the cathode, or both, may further comprise a polymeric binder. In a preferred embodiment, the binder may be polyvinylidene fluoride, styrene-butadiene rubber, polyamide, melamine resin, or combinations thereof.

The electrolytic solution in the present invention may further comprise one or more additives, such as a vinyl compound (e.g. vinylene carbonate, vinyl ethylene carbonate) to help generate a stable solid electrolyte interface at the surface of the graphite anode so as to increase the cycle life characteristic of the battery, and/or a sultone (e.g., 1,3-propane sultone, and 1,4-butane sultone) to prevent or to reduce gas generation of the electrolytic solution as the battery is charged and discharged at temperatures higher than ambient temperature, and/or an aromatic compound (e.g. biphenyl and cyclohexylbenzene) to prevent overcharge or overdischarge of the battery.

It is envisioned that the electrolytic solutions and batteries discussed herein have a wide range of applications, including, at least, calculators, wrist watches, hearing aids, electronics such as computers, cell phones, video games, and transportation applications such as battery powered and/or hybrid vehicles.

In general, the triazine compound may be added to the electrolytic solution, agitated, and the excess triazine compound removed, for example by filtering or decanting. Ease of removal makes it preferable that the triazine compound is a solid at room temperature (i.e., 25° C.). Alternately, the triazine compound may be packed into a column (e.g., similar to an ion exchange or chromatographic column) and the non-aqueous electrolytic solution may be separated through such column.

EXAMPLES

The following compositions represent exemplary embodiments of the invention. They are presented to explain the invention in more detail, and do not limit the invention. The starting point for all examples was to blend a solvent mixture of EC/EMC/DEC (1:1:1 by volume) and then $LiPF_6$ was added until a non-aqueous electrolytic solution having a $LiPF_6$ concentration of 1.0 M was obtained. Also, melamine was dried under vacuum at 120° C. to remove excess moisture.

For examples 1 and 2, 100 grams of the electrolytic solution (1.0 M $LiPF_6$ in EC/EMC/DEC of volume ratio 1:1:1) was introduced into separate containers. For example 3, 1000 grams of the solution was introduced into a separate container. The blending and testing was carried out at room temperature (i.e., 25° C.). For each example, the HF and $H_2O$ levels were measured, and then a prescribed amount of melamine was added, according to Table 1 and the solution agitated for about 10 minutes. The excess melamine was filtered from the solution, and the HF and $H_2O$ levels were determined again. Levels of HF and $H_2O$ are reported in ppm. The HF content was determined by traditional acid-base titration in an ice-water mixture and the water content was determined by Karl Fisher titration.

TABLE 1

HF and $H_2O$ levels before and after treatment of 1.0M $LiPF_6$ in EC/EMC/DEC (1/1/1 by volume) with melamine.

|  | Melamine added | HF before (ppm) | HF after (ppm) | $H_2O$ before (ppm) | $H_2O$ after (ppm) |
|---|---|---|---|---|---|
| Example 1 (100 g) | 0.09 g | 27.0 | 20.5 | 6.0 | 6.0 |
| Example 2 (100 g) | 0.35 g | 27.0 | 17.0 | 6.0 | 6.0 |
| Example 3 (1000 g) | 5.00 g | 65.0 | 13.5 | 6.0 | 1.4 |

What is claimed is:

1. A method of making a secondary battery comprising:
   providing an electrolytic solution comprising
   i. a non-aqueous electrolytic solvent and
   ii. a lithium containing salt;
   contacting the electrolytic solution with a triazine compound selected from the group consisting of
   2,6-bis-(2,4-dimethylphenyl)-4-(2-hydroxy-4-octyloxyphenyl)-s-triazine;
   2,6-bis(2,4-dimethylphenyl)-4-(2,4-dihydroxyphenyl)-s-triazine;
   2,4-bis(2,4-dihydroxyphenyl)-6-(4-chlorophenyl)-s-triazine;
   2,4-bis(2-hydroxy(2-hydroxyethoxy)phenyl)-6-(4-chlorophenyl)-s-triazine;
   2,4-bis(2-hydroxy-4-(2-hydroxyethoxy)phenyl)-phenyl-s-triazine;
   2,4-bis(2-hydroxy-4-(2-hydroxyethoxy)-phenyl)-6-(2,4-dimethylphenyl)-s-triazine;
   2,4-bis(2-hydroxy(2-hydroxyethoxy)phenyl)-6-(4-bromophenyl)-s-triazine;
   2,4-bis(2-hydroxy-4-(2-acetoryethoxy)phenyl)-6-(4-chlorophenyl)-s-triazine;

2,4-bis(2,4-dihydroxyphenyl)-6-(2,4-dimethylphenyl)-1-s-triazine;
2,4,6-trimethoxy-1,3,5-triazine;
2,4,6-triphenyoxy-1,3,5-triazine;
2,4,6-triethoxy-1,3,5-triazine;
2,4,6-tripropoxy-1,3,5-triazine;
2,4,6-tributoxy-1,3,5-triazine, and combinations thereof;
removing substantially all of the triazine compound from the electrolytic solution;
laminating and winding a cathode, a first porous separator, an anode, and a second porous separator;
placing the wound laminated electrodes and separators in a battery case;
infusing the electrolytic solution into the battery case; and,
sealing the battery case containing the electrodes, electrolytic solution and separators.

2. The method of claim 1 wherein the non-aqueous electrolytic solvent is selected from the group consisting of ethylene carbonate, propylene carbonate, butylene carbonate, dimethyl carbonate, diethyl carbonate, dipropyl carbonate, dibutyl carbonate, ethyl methyl carbonate, methyl propyl carbonate, ethyl propyl carbonate, tetrahydrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, β-propiolactone, δ-valerolactone, trimethyl phosphate, triethyl phosphate, tris(2-chloroethyl) phosphate, tris(2,2,2-trifluoroethyl) phosphate, tripropyl phosphate, triisopropyl phosphate, tributyl phosphate, trihexyl phosphate, triphenyl phosphate, tritolyl phosphate, and combinations thereof.

3. The method of claim 1 wherein the lithium containing salt is selected from the group consisting of $LiPF_6$, $LiBF_4$, $LiSbF_6$, $LiAsF_6$, $LiTaF_6$, $LiAlCl_4$, $Li_2B_{10}Cl_{10}$, LiBOB, LiBMB, LiBDFMB, LiMOB, LiDFMOB, LiTOP, LiTDFMP, $LiClO_4$, $LiCF_3SO_3$; $LiN(SO_2C_mF_{2m+1})(SO_2C_nF_{2n+1})$, and $LiC(SO_2C_kF_{2k+1})(SO_2C_mF_{2m+1})(SO_2C_nF_{2n+1})$, wherein k=1-10, m=1-10, and n=1-10, respectively; $LiN(SO_2C_pF_{2p}SO_2)$, and $LiC(SO_2C_pF_{2p}SO_2)(SO_2C_qF_{2q+1})$ wherein p=1-10 and q=1-10; and $LiPF_x(R_F)_{6-x}$ and $LiBF_y(R_F)_{4-y}$, wherein $R_F$ represents perfluorinated $C_1$-$C_{20}$ alkyl groups or perfluorinated aromatic groups, x=0-5, and y=0-3.

4. The method of claim 1 wherein the cathode comprises: a lithium mixed metal oxide selected from the group consisting of $LiMnO_2$, $LiMn_2O_4$, $LiCoO_2$, $Li_2Cr_2O_7$, $Li_2CrO_4$, $LiNiO_2$, $LiFeO_2$, $LiNi_zCo_{1-z}O_2(0<z<1)$, $LiFePO_4$, $Li_3VPO_4$, $LiMn_{0.5}Ni_{0.5}O_2$, $LiMn_{1/3}Co_{1/3}Ni_{1/3}O_2$, $LiNi_rCo_sMe_tO_2$ wherein Me may be one or more of Al, Mg, Ti, B, Ga, or Si and 0<r,s,t<1, and $LiMc_{0.5}Mn_{1.5}O_4$ wherein Mc is a divalent metal, and mixtures thereof.

5. The method of claim 1 wherein the anode comprises a material selected from the group consisting of crystalline carbon, lithium metal, $LiMnO_2$, $Li_4Ti_5O_{12}$, LiAl, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, and combinations thereof.

6. A method of preparing a non-aqueous electrolytic solution for a lithium battery wherein the method comprises: contacting a non aqueous electrolyte with a triazine compound to produce an electrolytic solution comprising less than about 20 ppm water and less than about 50 ppm acids, wherein the triazine compound is selected from the group consisting of
2,6-bis-(2,4-dimethylphenyl)-4-(2-hydroxy-4-octyloxyphenyl)-s-triazine;
2,6-bis(2,4-dimethylphenyl)-4-(2,4-dihydroxyphenyl)-s-triazine;
2,4-bis(2,4-dihydroxyphenyl)-6-(4-chlorophenyl)-s-triazine;
2,4-bis(2-hydroxy(2-hydroxyethoxy)phenyl)-6-(4-chlorophenyl)-s-triazine;
2,4-bis(2-hydroxy-4-(2-hydroxyethoxy)phenyl)-phenyl-s-triazine;
2,4-bis(2-hydroxy-4-(2-hydroxyethoxy)-phenyl)-6-(2,4-dimethylphenyl)-s-triazine;
2,4-bis(2-hydroxy(2-hydroxyethoxy)phenyl)-6-(4-bromophenyl)-s-triazine;
2,4-bis(2-hydroxy-4-(2-acetoryethoxy)phenyl)-6-(4-chlorophenyl)-s-triazine;
2,4-bis(2,4-dihydroxyphenyl)-6-(2,4-dimethylphenyl)-1-s-triazine;
2,4,6-trimethoxy-1,3,5-triazine;
2,4,6-triphenyoxy-1,3,5-triazine;
2,4,6-triethoxy-1,3,5-triazine;
2,4,6-tripropoxy-1,3,5-triazine;
2,4,6-tributoxy-1,3,5-triazine, and combinations thereof.

7. The method of claim 6 wherein the method produces an electrolytic solution comprising less than about 10 ppm water and less than about 20 ppm acids.

* * * * *